US010684155B2

(12) United States Patent
Itou

(10) Patent No.: US 10,684,155 B2
(45) Date of Patent: Jun. 16, 2020

(54) AIR FLOW RATE MEASUREMENT DEVICE

(71) Applicant: DENSO CORPORATION, Kariya, Aichi-pref. (JP)

(72) Inventor: Kengo Itou, Kariya (JP)

(73) Assignee: DENSO CORPORATION, Kariya (JP)

( * ) Notice: Subject to any disclaimer, the term of this patent is extended or adjusted under 35 U.S.C. 154(b) by 120 days.

(21) Appl. No.: 15/193,402

(22) Filed: Jun. 27, 2016

(65) Prior Publication Data

US 2016/0377470 A1 Dec. 29, 2016

(30) Foreign Application Priority Data

Jun. 29, 2015 (JP) .................................. 2015-129896

(51) Int. Cl.
| | | |
|---|---|---|
| *G01F 15/14* | (2006.01) | |
| *F01D 17/02* | (2006.01) | |
| *G01F 5/00* | (2006.01) | |
| *G01F 1/72* | (2006.01) | |
| *F02M 35/10* | (2006.01) | |
| *G01F 1/684* | (2006.01) | |

(52) U.S. Cl.
CPC ............. *G01F 15/14* (2013.01); *F01D 17/02* (2013.01); *G01F 1/72* (2013.01); *G01F 5/00* (2013.01); *F02M 35/10386* (2013.01); *G01F 1/6845* (2013.01)

(58) Field of Classification Search
CPC .......... G01F 15/00; G01F 15/14; F01D 17/00; F01M 35/10373; F01M 35/1038; F01M 35/10386; F01M 35/10393
USPC ....................... 73/114.31–114.37, 272 R, 273
See application file for complete search history.

(56) References Cited

U.S. PATENT DOCUMENTS

| | | | | | |
|---|---|---|---|---|---|
| 3,777,563 | A | * | 12/1973 | Yamasaki ............. | G01F 1/3209 73/861.22 |
| 4,213,335 | A | * | 7/1980 | Peter ....................... | G01F 1/692 73/204.15 |
| 4,433,576 | A | * | 2/1984 | Shih ........................ | G01F 1/684 73/204.21 |
| 4,434,656 | A | * | 3/1984 | Blechinger ............... | G01F 1/68 73/204.21 |
| 4,571,996 | A | * | 2/1986 | Wakeman ............... | G01F 1/684 73/202.5 |

(Continued)

FOREIGN PATENT DOCUMENTS

| | | |
|---|---|---|
| DE | 10 2008 042807 | 4/2010 |
| JP | 6164019 | 6/2017 |

*Primary Examiner* — Alexander A Mercado
(74) *Attorney, Agent, or Firm* — Nixon & Vanderhye P.C.

(57) ABSTRACT

An air flow rate measurement device includes a casing, a flow rate measurement portion, a first protrusion and a second protrusion. The casing is disposed in a main flow passage in which an air flows, and the casing defines a bypass passage therein to take in a part of the air flowing in the main flow passage. The flow rate measurement portion is housed in the casing and measures a flow rate of the air flowing in the bypass passage. The first protrusion protrudes from a side surface of the casing in the main flow passage. The second protrusion protrudes from the side surface of the casing in the main flow passage. The second protrusion is spaced from the first protrusion in a flow direction of the air in the main flow passage. The air flow rate measurement device is capable of limiting a generation of a separated vortex.

19 Claims, 12 Drawing Sheets

(56) References Cited

U.S. PATENT DOCUMENTS

| | | | | | |
|---|---|---|---|---|---|
| 4,624,138 A | * | 11/1986 | Ono | G01F 1/6845 | 29/620 |
| 4,690,211 A | * | 9/1987 | Kuwahara | B21C 37/207 | 138/38 |
| 4,715,436 A | * | 12/1987 | Takahashi | B21C 37/20 | 165/110 |
| 4,776,213 A | * | 10/1988 | Blechinger | G01F 1/6842 | 73/114.34 |
| 5,128,098 A | * | 7/1992 | Nakamura | G21C 3/322 | 376/352 |
| 5,209,113 A | * | 5/1993 | Sawada | F02D 41/187 | 73/114.34 |
| 5,282,385 A | * | 2/1994 | Kayano | G01F 1/6842 | 338/312 |
| 5,467,648 A | * | 11/1995 | Igarashi | G01F 1/6842 | 73/114.34 |
| 5,485,746 A | * | 1/1996 | Mori | F02D 41/187 | 73/114.34 |
| 5,571,964 A | * | 11/1996 | Sawada | G01F 1/6842 | 73/114.34 |
| 5,804,718 A | * | 9/1998 | Nagasaka | G01F 1/6842 | 73/114.34 |
| 5,939,628 A | * | 8/1999 | Igarashi | G01F 1/684 | 73/202 |
| 6,079,264 A | * | 6/2000 | Yamakawa | G01F 1/6845 | 73/204.22 |
| 6,234,015 B1 | * | 5/2001 | Hamada | G01F 1/684 | 73/202.5 |
| 6,705,159 B2 | * | 3/2004 | Lenzing | G01F 1/6842 | 73/202.5 |
| 6,871,534 B1 | * | 3/2005 | Hamada | F02D 41/185 | 73/202.5 |
| 7,278,320 B1 | * | 10/2007 | Clifton | G01F 1/44 | 73/736 |
| 7,836,780 B2 | * | 11/2010 | Garnett | G01F 1/46 | 73/861.22 |
| 7,942,052 B2 | * | 5/2011 | Ariyoshi | G01F 1/72 | 73/202.5 |
| 7,942,053 B2 | * | 5/2011 | Saito | G01F 1/6845 | 73/204.21 |
| RE42,529 E | * | 7/2011 | Watanabe | G01F 1/6842 | 73/202.5 |
| 8,590,368 B2 | * | 11/2013 | Kitahara | G01F 1/6842 | 73/114.32 |
| 8,701,474 B2 | * | 4/2014 | Tagawa | G01F 1/6842 | 73/114.32 |
| 8,707,771 B2 | * | 4/2014 | Kaifu | G01M 15/02 | 73/114.32 |
| 8,733,166 B2 | * | 5/2014 | Ooga | G01F 1/6842 | 73/204.25 |
| 8,756,989 B2 | * | 6/2014 | Goka | G01F 15/14 | 73/204.26 |
| 8,844,342 B2 | * | 9/2014 | Kitahara | G01M 15/04 | 73/114.34 |
| 8,904,854 B2 | * | 12/2014 | Goka | G01F 1/6842 | 73/114.32 |
| 9,546,001 B2 | * | 1/2017 | Steinert | B64D 13/02 | |
| 2003/0071525 A1 | * | 4/2003 | Tong | H02K 1/20 | 310/65 |
| 2005/0262937 A1 | * | 12/2005 | Emmert, Jr. | G01F 1/6842 | 73/202.5 |
| 2006/0021429 A1 | * | 2/2006 | Konzelmann | F02D 41/18 | 73/202.5 |
| 2006/0207344 A1 | * | 9/2006 | Welker | G01F 1/46 | 73/861.65 |
| 2007/0062275 A1 | * | 3/2007 | Beyrich | G01F 1/6842 | 73/204.21 |
| 2007/0062276 A1 | * | 3/2007 | Konzelmann | G01F 1/6842 | 73/204.21 |
| 2007/0163338 A1 | * | 7/2007 | Konzelmann | G01F 1/6842 | 73/114.32 |
| 2010/0291852 A1 | * | 11/2010 | Steinert | B64D 13/02 | 454/71 |
| 2011/0083515 A1 | * | 4/2011 | Phillips | G01F 1/22 | 73/861.24 |
| 2011/0088464 A1 | | 4/2011 | Ariyoshi et al. | | |
| 2011/0179858 A1 | * | 7/2011 | Mais | G01F 1/6842 | 73/114.32 |
| 2012/0324990 A1 | * | 12/2012 | Briese | G01F 1/684 | 73/114.35 |
| 2015/0177037 A1 | * | 6/2015 | Wagner | G01N 27/048 | 73/204.22 |
| 2015/0308872 A1 | | 10/2015 | Sudou et al. | | |
| 2016/0312753 A1 | * | 10/2016 | Sudou | F02M 35/10386 | |
| 2017/0284841 A1 | * | 10/2017 | Lais | G01F 1/3209 | |

\* cited by examiner

AIR FLOW RATE MEASUREMENT DEVICE

CROSS REFERENCE TO RELATED APPLICATION

This application is based on and incorporates herein by reference Japanese Patent Application No. 2015-129896 filed on Jun. 29, 2015.

TECHNICAL FIELD

The present disclosure relates to an air flow rate measurement device measuring a flow rate of air.

BACKGROUND

Conventionally, an air flow rate measurement device measuring an amount of an air drawn into an engine is known. The air flow rate measurement device includes a casing disposed in an intake air passage of the engine. The casing defines a bypass passage therein to take in a part of the air drawn in the engine, and an outlet of the bypass passage is open on a lateral surface of the casing. When the amount of the air drawn into the engine varies temporally, a pulsation flow is generated, and accordingly a speed of the air varies. A separated vortex generated when the speed of the air decreases tends to be larger than a separated vortex generated when the speed of the air increases. This is caused by a generation of an adverse pressure gradient in the decrease of the speed of the air. In the adverse pressure gradient, a pressure gradient is opposite to a flow direction of the air. When the pulsation flow is so large that the air flows in a backward flow direction, the separated vortex moves with the air flowing from a downstream side toward an upstream side of the casing in the backward flow direction. In this case, a part of the separated vortex generated on the downstream side of the casing enters the bypass passage, and accordingly a pressure loss increases. Consequently, a detection accuracy of a flow rate sensor may decrease.

Patent Document 1 (JP 4686455 B) discloses a technology capable of limiting a generation of the separated vortex. An air flow rate measurement device disclosed in Patent Document 1 includes an air discharge port on a lateral wall of a casing, a guide wall, and multiple protrusions on an outer surface of the guide wall. The guide wall is located downstream of the lateral wall having the discharge port, and the guide wall extends in approximately parallel to the lateral wall.

The technology disclosed in Patent Document 1 may not capable of limiting the separated vortex generated by an air flowing in a backward flow direction. An intake air pulsation is generated in an intake air passage of an engine according to opening and closing of a supply valve and a discharge valve. When the intake air pulsation is large, the air flows in a direction opposed to a forward flow direction. An airflow in the forward flow direction is referred to as a forward flow, and an airflow in the direction opposed to the forward flow direction is referred to as a backward flow. When the backward flow is generated in the intake air passage, the separated vortex is generated on the downstream side of the casing. The downstream side in the backward flow corresponds to an upstream side in the forward flow. However, the configuration of Patent Document 1 may not be capable of limiting the separated vortex generated when the air flows in the backward flow.

SUMMARY

It is an objective of the present disclosure to provide an air flow rate measurement device being capable of limiting a generation of a separated vortex in both a forward airflow and a backward airflow.

According to an aspect of the present disclosure, an air flow rate measurement device includes a casing, a flow rate measurement portion, a first protrusion and a second protrusion. The casing is disposed in a main flow passage in which an air flows, and the casing defines a bypass passage therein to take in a part of the air flowing in the main flow passage. The flow rate measurement portion is housed in the casing and measures a flow rate of the air flowing in the bypass passage. The first protrusion protrudes from a side surface of the casing in the main flow passage. The second protrusion protrudes from the side surface of the casing in the main flow passage. The second protrusion is spaced from the first protrusion in a flow direction of the air in the main flow passage.

In this configuration, since the first protrusion and the second protrusion provided on the side surface are spaced from each other in the flow direction of the air, a separated vortex caused by the air flowing in both a forward flow direction and a backward flow direction can be limited. For example, a direction in which the air flows in the main flow passage from one side toward the other side is defined as a forward flow direction, and a direction in which the air flows in the main flow passage from the other side toward the one side is defined as a backward flow direction. When the air flows in the forward flow direction, the first protrusion is positioned upstream of the second protrusion. When the air flows in the backward flow direction, the second protrusion is positioned upstream of the first protrusion. Therefore, when the air flows in the forward flow direction, a small vortex is generated in an airflow by the first protrusion. When the air flows in the backward flow direction, the small vortex is generated in the airflow by the second protrusion. Since the small vortex is generated in the airflow, a separation of the air from the side surface of the casing is limited, and accordingly a generation of a separated vortex can be limited.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
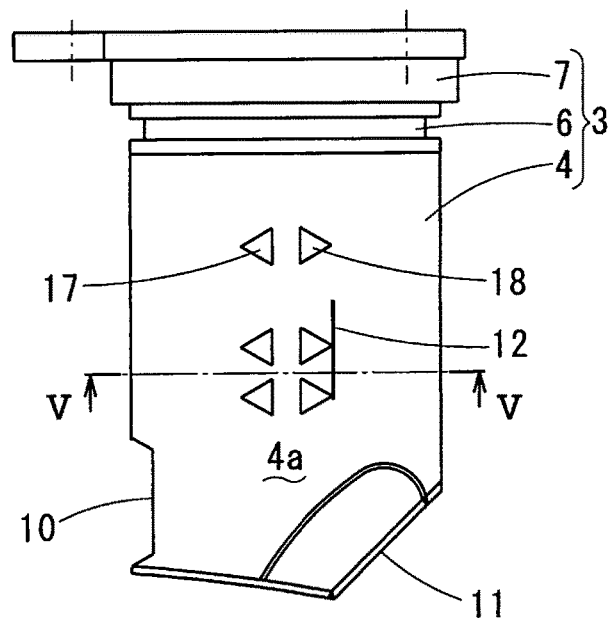
FIG. 1 is a side view illustrating an air flow rate measurement device according to a first embodiment of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

In a first embodiment, an example of an air flow rate measurement device 1 measuring an amount of an intake air drawn into an engine will be described below.

Figure 6:
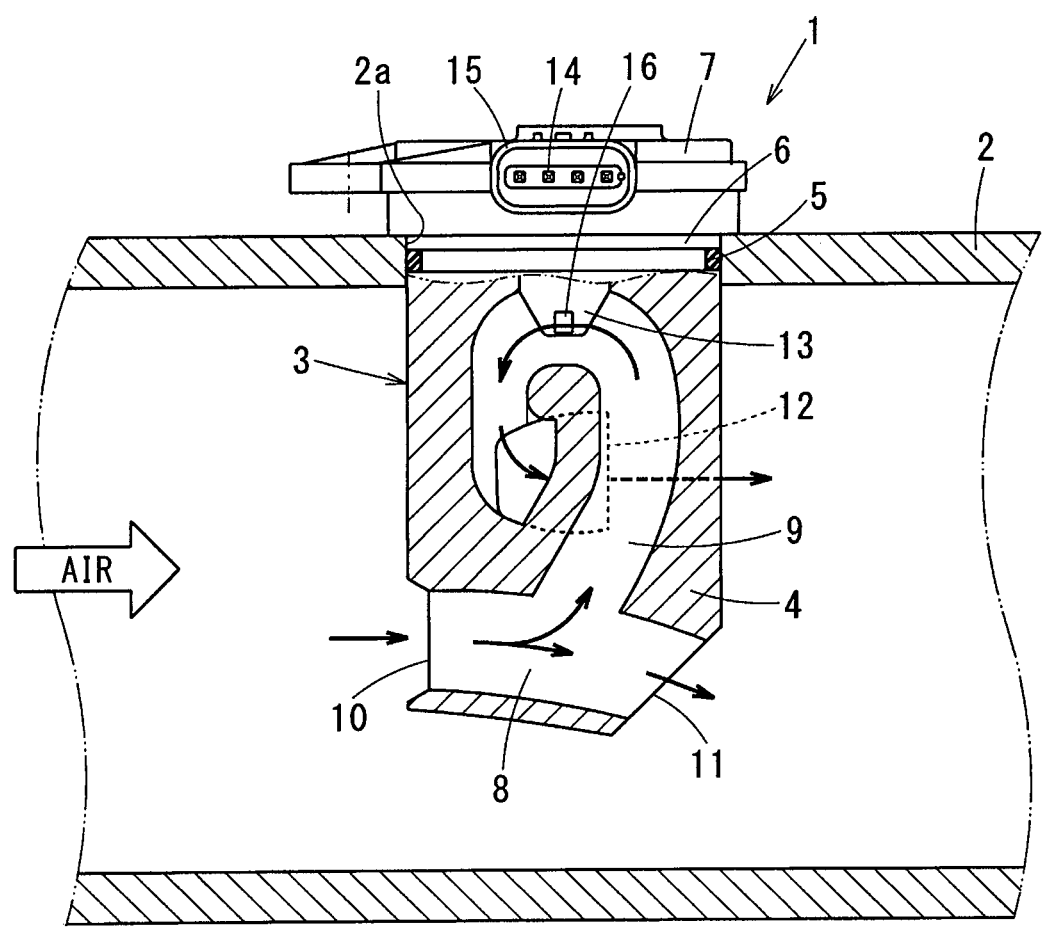
FIG. 6 is a sectional diagram illustrating the air flow rate measurement device according to the first embodiment.

The air flow rate measurement device 1 includes a housing 3 attached to an intake air duct 2 of the engine, and a flow rate sensor housed inside the housing 3, as shown in FIG. 6. The intake air duct 2 is located upstream of a throttle valve, for example, and includes a main flow passage of the present disclosure. The intake air duct 2 may be the main flow passage. The intake air duct 2 has an attachment hole 2a on an annular wall of the intake air duct 2 and having a circular cylindrical shape. The housing 3 includes a casing 4, an attachment portion 6, and a connector inclusion portion 7. The casing 4 is inserted into an inside of the intake air duct 2 through the attachment hole 2a. The attachment portion 6 is airtightly engaged with an inner periphery of the attachment hole 2a through an O-ring 5. The connector inclusion portion 7 is exposed to an outside of the intake air duct 2 from the attachment hole 2a.

The casing 4 defines a bypass passage therein to take in a part of an air flowing in the intake air duct 2. The bypass passage includes a first bypass passage 8 and a second bypass passage 9. The first bypass passage 8 has a roughly straight shape and lets an inlet 10 of the casing 4 and a dust discharge port 11 communicate with each other. The first bypass passage 8 makes a dust contained in the air introduced from the inlet 10 flow straight ahead to discharge the dust from the dust discharge port 11. The second bypass passage 9 is branched from a part of the first bypass passage 8 and communicates with a bypass outlet 12 that is open on both two side surfaces (lateral surfaces) 4a of the casing 4. The second bypass passage 9 includes a U turn portion in which a flow direction of the air is changed by approximately 180 degrees. The U turn portion includes a throttle portion 13 in which a sectional area of the second bypass passage 9 is made smaller.

Figure 4:
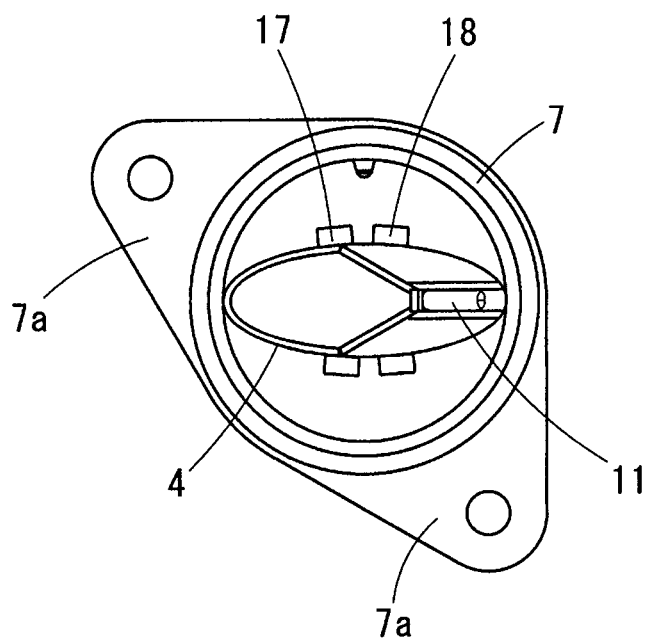
FIG. 4 is a bottom view illustrating the air flow rate measurement device according to the first embodiment.

The attachment portion 6 is provided integrally with the casing 4 and includes a sensor inclusion room in which a flow rate sensor is mounted. A sensor insertion hole through which the sensor inclusion room and the throttle portion 13 communicating with each other is provided in the sensor inclusion room. The connector inclusion portion 7 is formed (molded secondarily) on the attachment portion 6 in a situation where the flow rate sensor is mounted in the sensor inclusion room, and the connector inclusion portion 7 covers the sensor inclusion room airtightly. An attachment flange 7a attached to the intake air duct 2 is provided integrally with the connector inclusion portion 7, as shown in FIG. 4, and a terminal 14 electrically connected with a terminal of the flow rate sensor is inserted into the connector inclusion portion 7. An end portion of the terminal 14 protrudes into an inside of a connector body 15 (refer to FIG. 6) provided in the connector inclusion portion 7. The flow rate sensor includes a flow rate measurement portion 16 and a circuit portion. The flow rate measurement portion 16 is chip type and is inserted into the throttle portion 13 through the sensor insertion hole. The circuit portion generates an electric signal according to an output of the flow rate measurement portion 16 outputted based on both an air flow rate and a direction of the airflow, and the electric signal generated by the circuit portion is outputted through the terminal 14.

Figure 5:
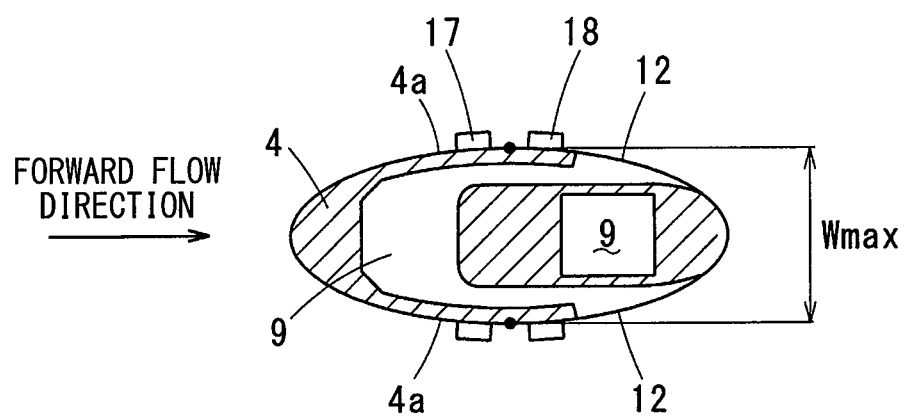
FIG. 5 is a sectional diagram taken along a line V-V of FIG. 1.

Characteristics of a shape of the casing 4 will be described below. In a cross sectional shape of the casing 4 shown in FIG. 5, a dimension between one side surface 4a and the other side surface 4a is referred to as a width of the casing 4. A dimension between the one side surface 4a and the other side surface 4a along a direction perpendicular to both the flow direction of the air and a direction in which the casing 4 extends may be referred to as the width of the casing 4. The casing 4 includes a widest portion Wmax between one end portion and the other end portion of the casing 4 in the flow direction of the air, as shown in FIG. 5. The widest portion Wmax has a maximum width. The one end portion corresponds to the end portion on left side of FIG. 5, and the other end portion corresponds to the end portion on right side of FIG. 5. The width of the cross sectional shape gradually decreases in size from the widest portion Wmax toward the one end portion. The width of the cross sectional shape gradually decreases in size from the widest portion Wmax toward the other end portion. A direction in which an air flows in the intake air duct 2 to be drawn in an engine is referred to as a forward flow direction (first direction), and an opposite direction from the forward flow direction is referred to as a backward flow direction (second direction). The forward flow direction may correspond to a direction represented by an arrow shown in FIG. 6.

Figure 2:
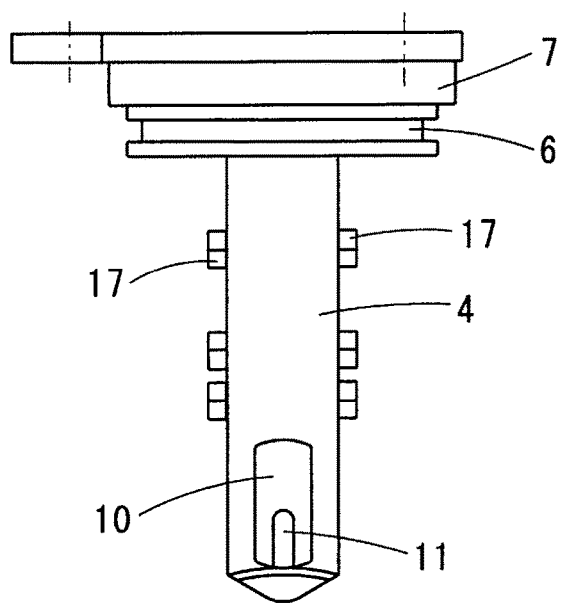
FIG. 2 is a front view illustrating the air flow rate measurement device according to the first embodiment.
Figure 3:
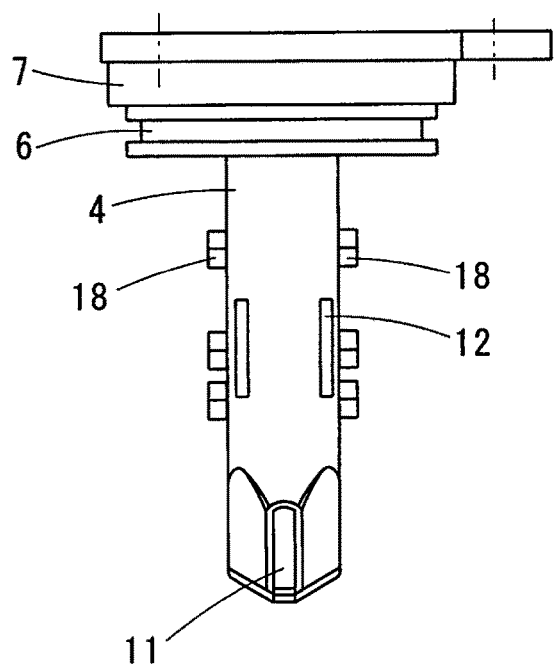
FIG. 3 is a back view illustrating the air flow rate measurement device according to the first embodiment.

A first protrusion 17 and a second protrusion 18 are provided on the side surface 4a of the casing 4 and protrude into an airflow along the side surface 4a. The first protrusion 17 and the second protrusion 18 may protrude into an inside of the intake flow duct 2. The first protrusion 17 is positioned upstream of the widest portion Wmax of the casing 4 in the forward flow direction, and a shape of the first protrusion 17 viewed along a direction perpendicular to the side surface 4a protrudes toward an upstream side in the forward flow direction and has a triangular shape, as shown in FIG. 1. One of vertices of the triangular shape may be opposed to the air flowing in the forward flow direction. The second protrusion 18 is positioned downstream of the widest portion Wmax of the casing 4 in the forward flow direction, and a shape of the second protrusion 18 viewed along a direction perpendicular to the side surface 4a protrudes toward an upstream side in a backward flow direction and has a triangular shape, as shown in FIG. 1. One of vertices of the triangular shape may be opposed to the air flowing in the forward flow direction. Multiple first protrusions 17 are provided on the side surface 4a and spaced from each other in a direction perpendicular to the flow direction of the air. The second protrusions 18 are provided on the side surface 4a and spaced from each other in the direction perpendicular to the flow direction of the air. The direction perpendicular to the flow direction of the air corresponds to an up-down direction of the FIGS. 1 to 3.

Figure 31:
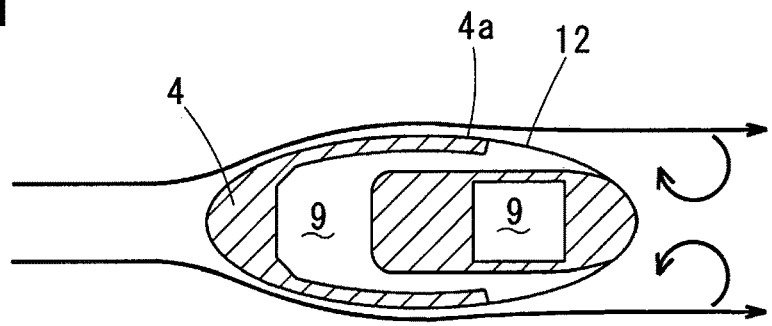
FIG. 31 is a diagram illustrating a separated vortex generated downstream of a casing when the speed of an air increases, according to a comparative example.
Figure 32:
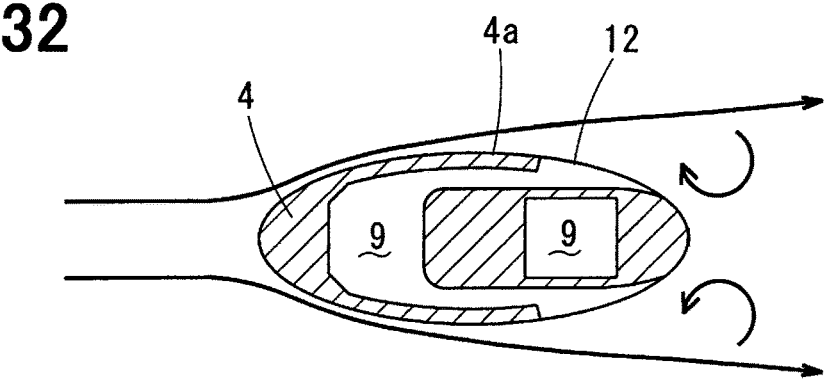
FIG. 32 is a diagram illustrating the separated vortex generated downstream of the casing when the speed of the air decreases, according to the comparative example.
Figure 33:
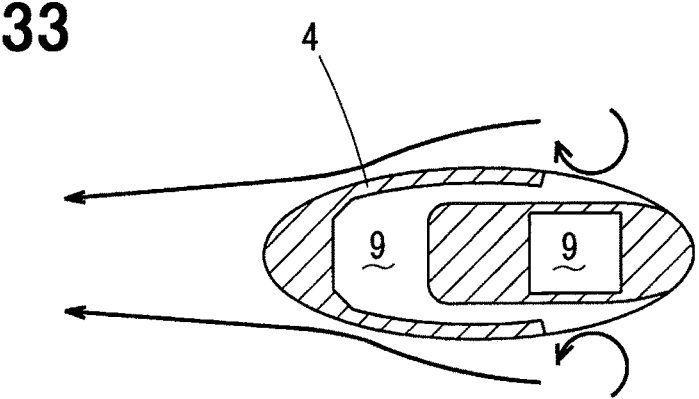
FIG. 33 is a diagram illustrating the separated vortex moving with the air flowing from a downstream side toward an upstream side of the casing in a backward flow direction, according to the comparative example; and, FIG. 34 is a diagram illustrating the separated vortex generated downstream of the casing when the air flows in the backward flow direction, according to the comparative example.
Figure 34:
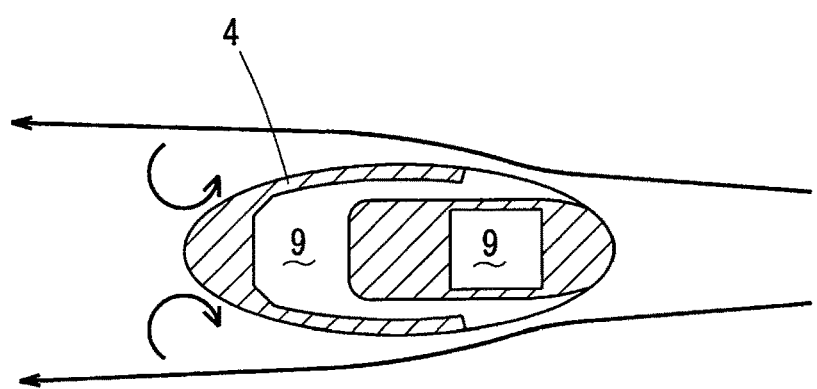

When an amount of the air drawn into the engine varies temporally, a pulsation flow is generated, and accordingly a speed of the air varies. FIGS. 31 to 34 show a comparative example where the casing 4 does not have the first and second protrusions 17, 18 on the side surface 4a. FIG. 31 shows a separated vortex generated downstream of the casing 4 when the speed of the air increases, according to a comparative example. FIG. 32 shows the vortex generated downstream of the casing 4 when the speed of the air decreases, according to the comparative example. FIG. 33 shows the separated vortex moving with the air flowing from a downstream side toward an upstream side of the casing 4 in the backward flow direction, according to the comparative example. FIG. 34 shows the separated vortex generated downstream of the casing 4 when the air flows in the backward flow direction, according to the comparative example. As shown in FIGS. 31 and 32, the separated vortex generated when the speed of the air decreases tends to be larger than the separated vortex generated when the speed of the air increases. This is caused by a generation of an adverse pressure gradient in the decrease of the speed of the air. In the adverse pressure gradient, a pressure gradient is opposite to the flow direction of the air. When the pulsation flow is so large that the air flows in the backward flow direction, the separated vortex moves with the air flowing from a downstream side toward the upstream side of the casing 4 in the backward flow direction. In this case, a part of the separated vortex generated on the downstream side of the casing 4 enters the second bypass passage 9, and accordingly a pressure loss increases. Consequently, a detection accuracy of the flow rate sensor may decrease. An intake air pulsation is generated in the intake air passage 2 of the engine according to opening and closing of a supply valve and a discharge valve. When the intake air pulsation is large, the air flows in the backward direction. An airflow in the forward flow direction is referred to as a forward flow, and an airflow in the direction opposed to the forward flow direction is referred to as a backward flow. When the backward flow is generated in the intake air passage 2, the separated vortex is generated on the downstream side of the casing 4. The downstream side in the backward flow corresponds to an upstream side in the forward flow. However, the configuration of the comparative example may not be capable of limiting the separated vortex generated when the air flows in the backward flow direction.

Figure 7:
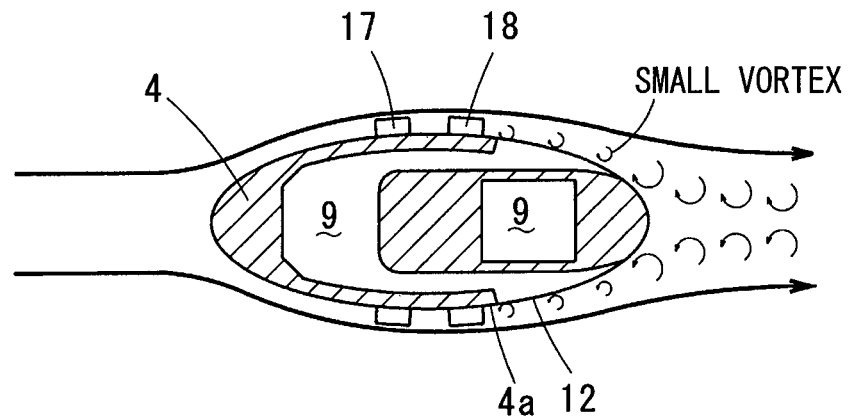
FIG. 7 is a diagram illustrating an airflow when a speed of an air increases, according to the first embodiment.
Figure 8:
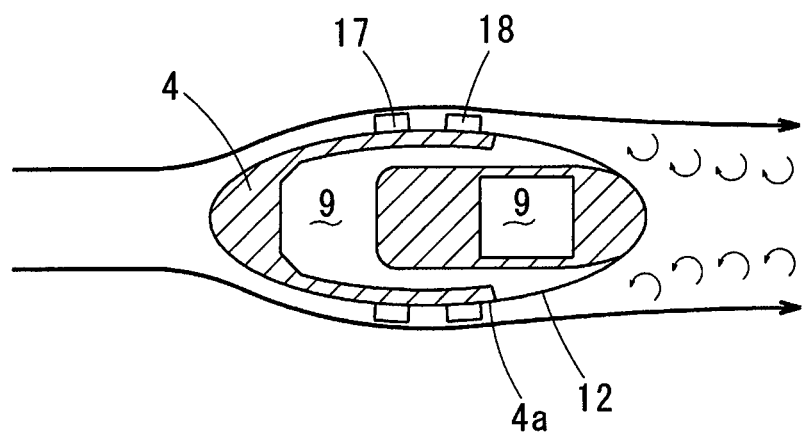
FIG. 8 is a diagram illustrating the airflow when the speed of the air decreases, according to the first embodiment.
Figure 9:
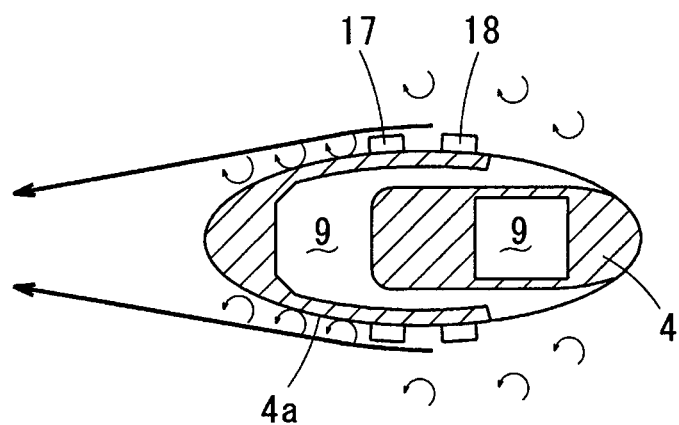
FIG. 9 is a diagram illustrating the airflow when the air flows in a backward flow direction, according to the first embodiment.

On the other hand, the air flow rate measurement device 1 of the first embodiment is capable of limiting a generation of the separation of an air in both forward flow direction and backward flow direction by the first protrusion 17 and the second protrusion 18 provided on the side surface 4a of the casing 4. When an air flows in the forward flow direction, a small vortex along the side surface 4a is generated downstream of the first protrusion 17, as shown in FIG. 7, and accordingly an airflow along the side surface 4a is disturbed. Therefore, the separation of the air on the downstream side of the casing 4 is limited, and accordingly a generation of a separated vortex larger than the small vortex can be limited. FIG. 7 shows an airflow increasing in speed. When the speed of the air decreases as shown in FIG. 8, the small vortex along the side surface 4a is generated downstream of the first protrusion 17, and accordingly the generation of the separated vortex can be limited.

When the air flows in the backward flow direction due to a pulsation of an intake air, the small vortex along the side surface 4a of the casing 4 is generated downstream of the second protrusion 18 in the backward flow direction. Accordingly, the separation of the air on the downstream side of the casing 4 in the backward flow direction is limited, and the generation of the separated vortex can be limited.

As described above, the generation of the separated vortex can be limited on the downstream side of the casing 4 in both the forward flow direction and the backward flow direction. Accordingly, even when the air flows in the backward flow direction, the separated vortex can be limited not to enter the first bypass passage 8. Consequently, the airflow in the second bypass passage 9 is not influenced by the separated vortex, and accordingly a decrease of accuracy of the flow rate sensor can be limited.

Other embodiments of the present disclosure will be described below. In the embodiments, a part that corresponds to a matter described in the first embodiment may be assigned with the same reference numeral as the first embodiment, and redundant explanation for the part may be omitted.

Second Embodiment

Figure 10:
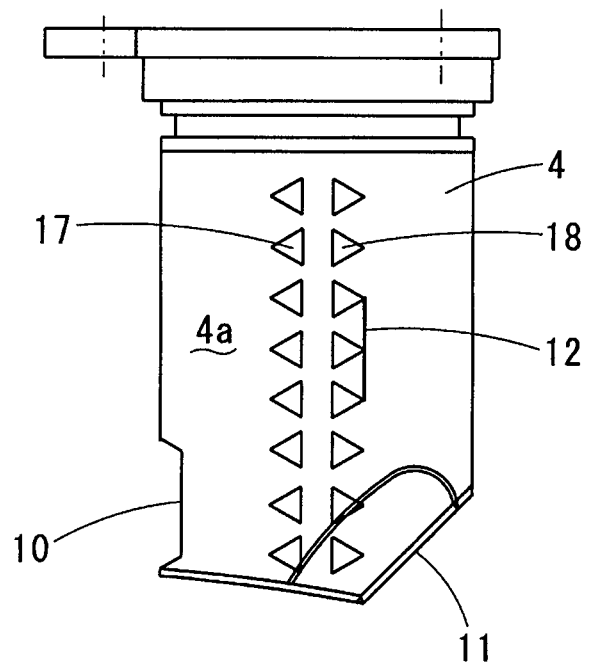
FIG. 10 is a side view illustrating an air flow rate measurement device according to a second embodiment of the present disclosure.
Figure 11:
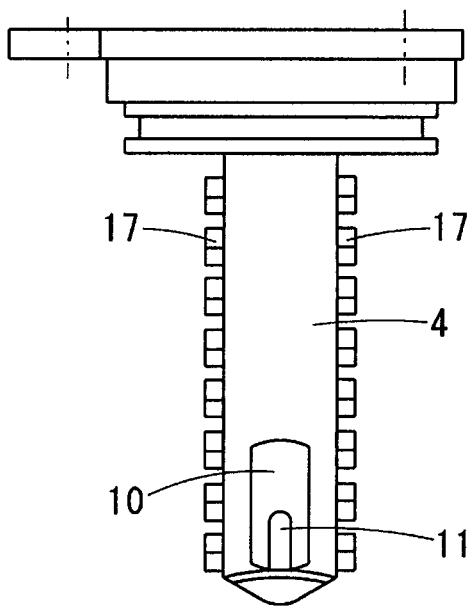
FIG. 11 is a front view illustrating the air flow rate measurement device according to the second embodiment.
Figure 12:
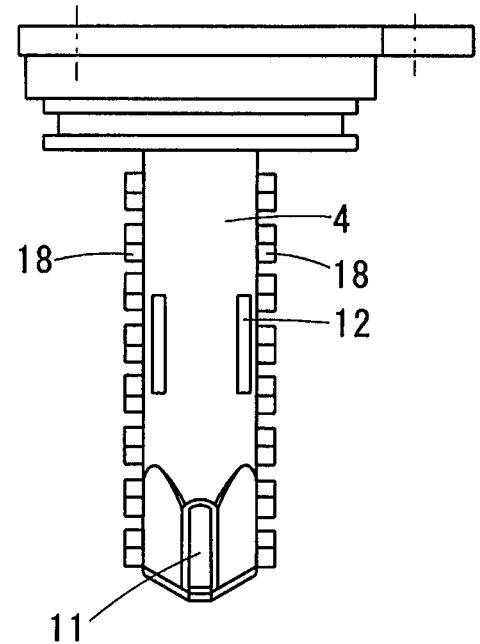
FIG. 12 is a back view illustrating the air flow rate measurement device according to the second embodiment.

A second embodiment is an example where multiple first protrusions 17 are provided on a side surface 4a of a casing 4 and spaced from each other in a direction perpendicular to a flow direction of an air, as shown in FIGS. 10 to 12. In the second embodiment, the second protrusions 18 are also provided on the side surface 4a of the casing 4 and spaced from each other in the direction perpendicular to the flow direction. The direction perpendicular to the flow direction corresponds to an up-down direction of FIGS. 10 to 12. Multiple first and second protrusions 17, 18 generate multiple small eddies to increase an effect of a disturbed airflow. When an air flows in a forward flow direction, multiple small eddies along the side surface 4a are generated downstream of the first protrusions 17. When an air flows in a backward flow direction, multiple small eddies along the side surface 4a are generated downstream of the second protrusions 18. Consequently, the effect disturbing the airflow increases in both the forward flow direction and the backward flow direction, and accordingly, an effect limiting a generation of a separated vortex may increase.

Third Embodiment

Figure 13:
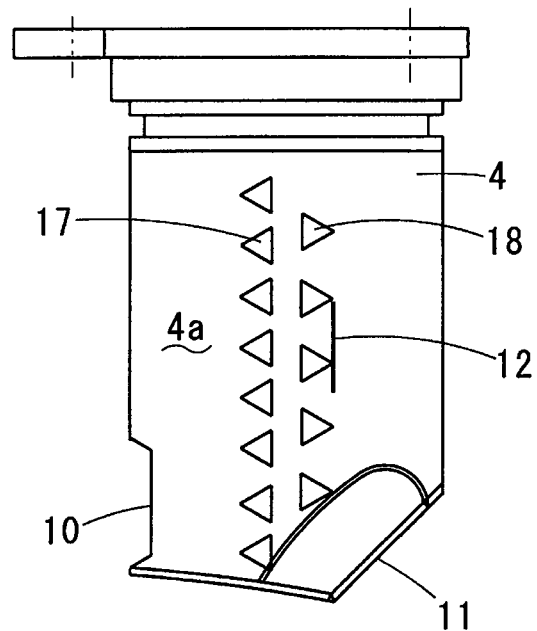
FIG. 13 is a side view illustrating an air flow rate measurement device according to a third embodiment of the present disclosure.
Figure 14:
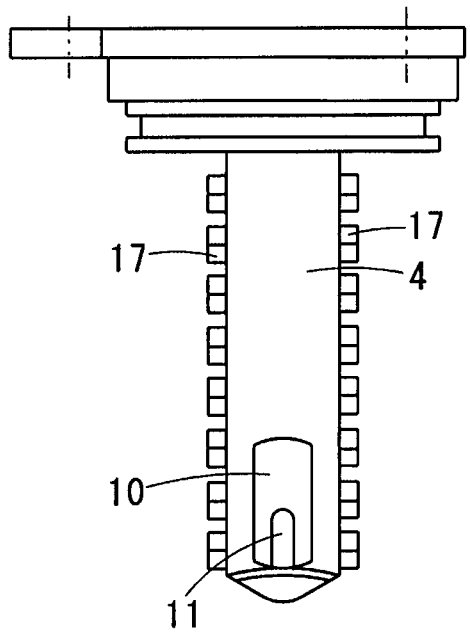
FIG. 14 is a front view illustrating the air flow rate measurement device according to the third embodiment.
Figure 15:
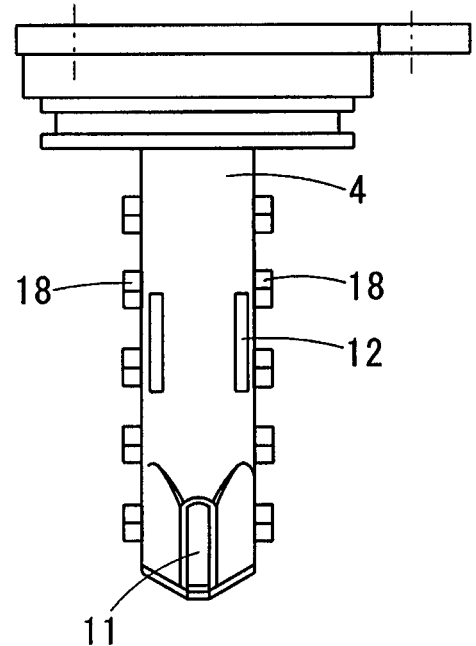
FIG. 15 is a back view illustrating the air flow rate measurement device according to the third embodiment.

A third embodiment is an example where the number of first protrusions 17 is larger than the number of second protrusions 18, as shown in FIGS. 13 to 15. In this case, because an effect limiting a generation of a separation of an air flowing in a forward flow direction is larger than an effect limiting the generation of the air flowing in a backward flow direction, a flow rate sensor may be capable of detecting accurately an amount of the air drawn into an engine.

Fourth Embodiment

Figure 16:
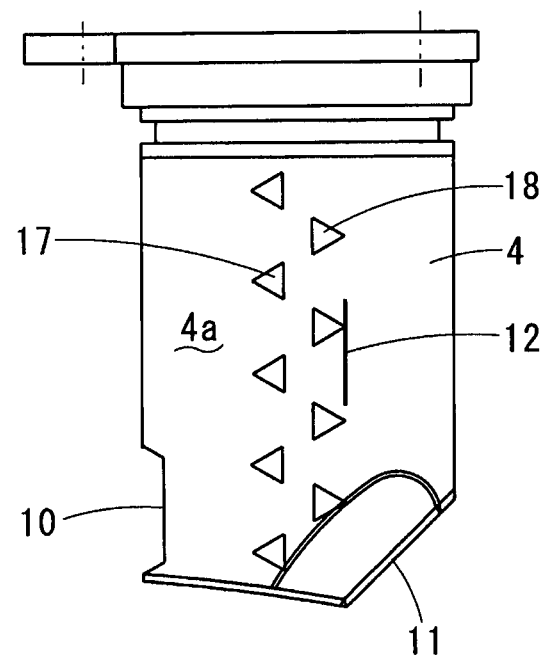
FIG. 16 is a side view illustrating an air flow rate measurement device according to a fourth embodiment of the present disclosure.
Figure 17:
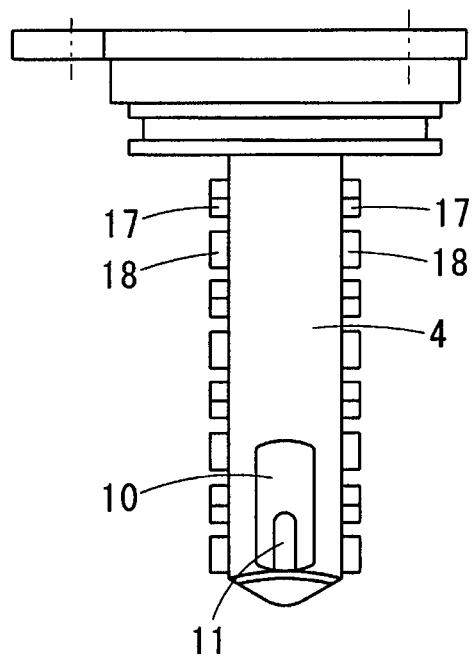
FIG. 17 is a front view illustrating the air flow rate measurement device according to the fourth embodiment.
Figure 18:
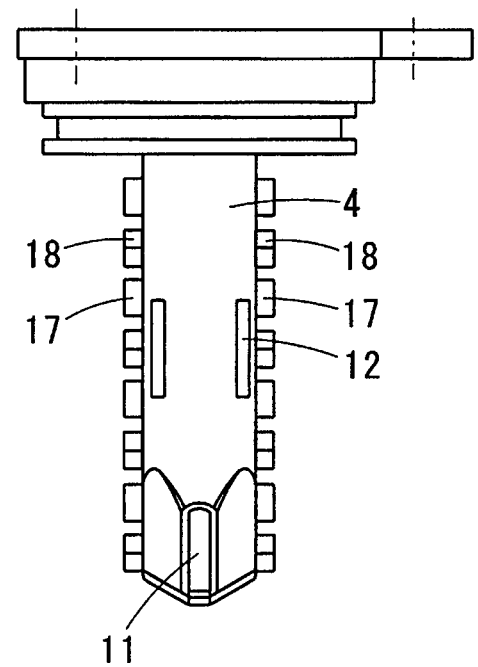
FIG. 18 is a back view illustrating the air flow rate measurement device according to the fourth embodiment.

A fourth embodiment is an example where first protrusions 17 and second protrusions 18 are provided on a side surface 4a of a casing 4 and offset from each other in a direction perpendicular to a flow direction of an air. The first protrusions 17 and the second protrusions 18 may be arranged alternately along the direction perpendicular to the flow direction. The direction perpendicular to the flow direction may correspond to an up-down direction of FIGS. 16 to 18. According to this configuration, when the air flows in a forward flow direction, an airflow passing between two first protrusions 17 is disturbed by the second protrusion 18, and accordingly a small vortex is generated downstream of the second protrusion 18 besides downstream of the first protrusion 17. When the air flows in a backward flow direction, an airflow passing between two second protrusions 18 is disturbed by the first protrusion 17, and accordingly the small vortex is generated downstream of the first protrusion 17 besides downstream of the second protrusion 18. According to this, multiple small eddies can be generated by a small number of first and second protrusions 17, 18, and a generation of a separated vortex can be limited effectively.

Fifth Embodiment

Figure 19:
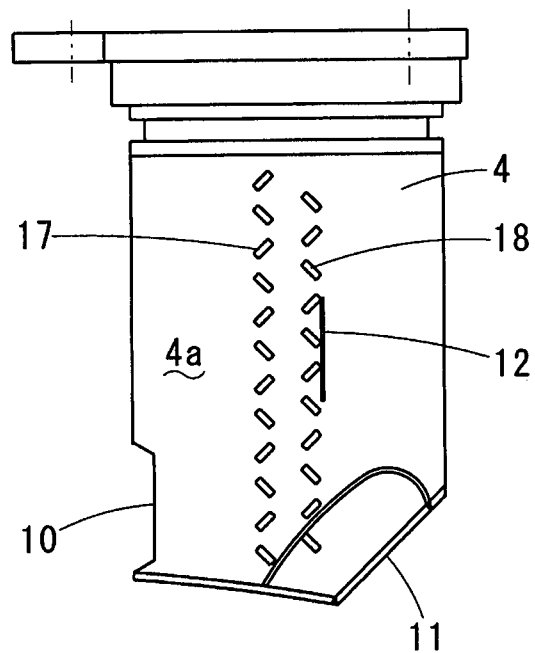
FIG. 19 is a side view illustrating an air flow rate measurement device according to a fifth embodiment of the present disclosure.
Figure 20:
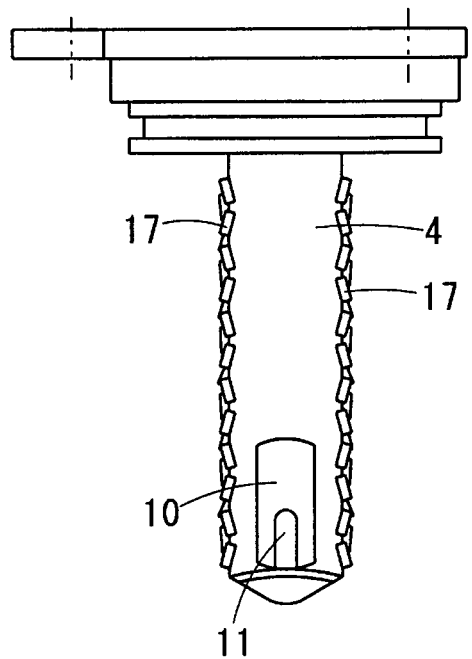
FIG. 20 is a front view illustrating the air flow rate measurement device according to the fifth embodiment.
Figure 21:
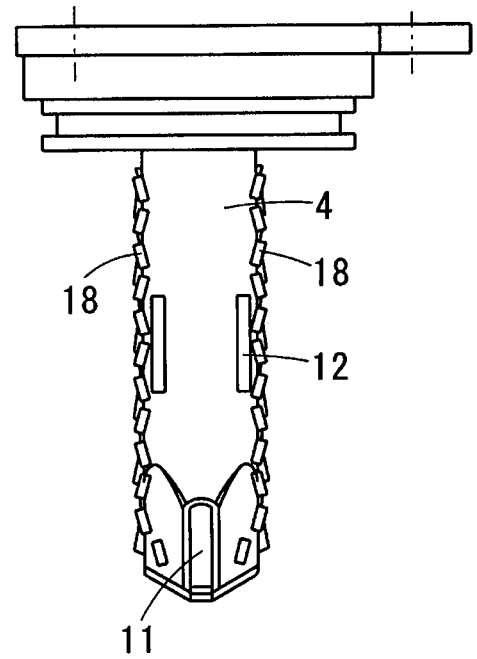
FIG. 21 is a back view illustrating the air flow rate measurement device according to the fifth embodiment.

A fifth embodiment is an example where a first protrusion 17 and a second protrusion 18 are angled (inclined) to a flow direction of an air, as shown in FIGS. 19 to 21. The first protrusion 17 and the second protrusion 18 have a rectangular shape (as shown in FIG. 19) when viewed from a direction perpendicular to a side surface 4a of casing 4. The first protrusion 17 and the second protrusion 18 are diagonal at 45 degrees to the flow direction, for example. Multiple first protrusions 17 are provided on the side surface 4a and arranged at regular intervals in a direction perpendicular to the flow direction. The direction perpendicular to the flow direction corresponds to an up-down direction of FIGS. 19 to 21. Each first protrusion 17 is oblique in a direction different from a direction in which adjacent first protrusion 17 tilts. The second protrusions 18 are provided on the side surface 4a and offset from the first protrusions 17 in the direction perpendicular to the flow direction of the air. The first protrusions 17 and the second protrusions 18 may be arranged alternately along the direction perpendicular to the flow direction. Each second protrusion 18 is oblique in a direction different from a direction in which adjacent second protrusion 18 tilts. According to this configuration, multiple small eddies can be generated effectively on a downstream side of the casing 4 in both a forward flow direction and a backward flow direction, and accordingly a generation of a separated vortex can be limited.

Although the present disclosure has been fully described in connection with the preferred embodiments thereof with reference to the accompanying drawings, it is to be noted that various changes and modifications will become apparent to those skilled in the art.

Figure 22:
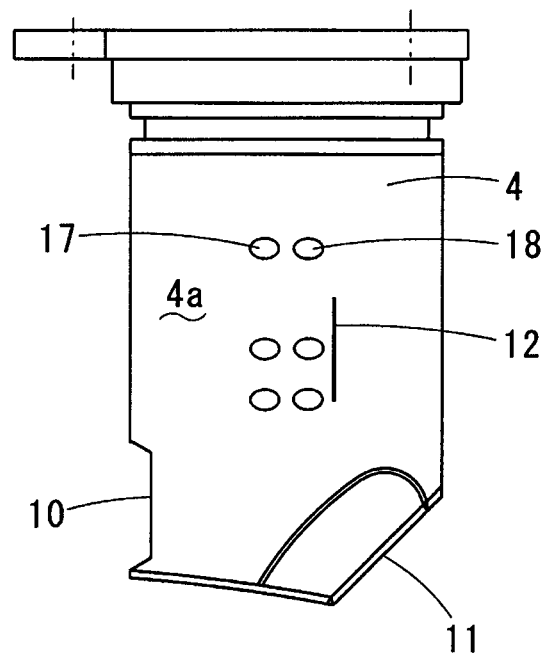
FIG. 22 is a side view illustrating an air flow rate measurement device according to a sixth embodiment of the present disclosure.
Figure 23:
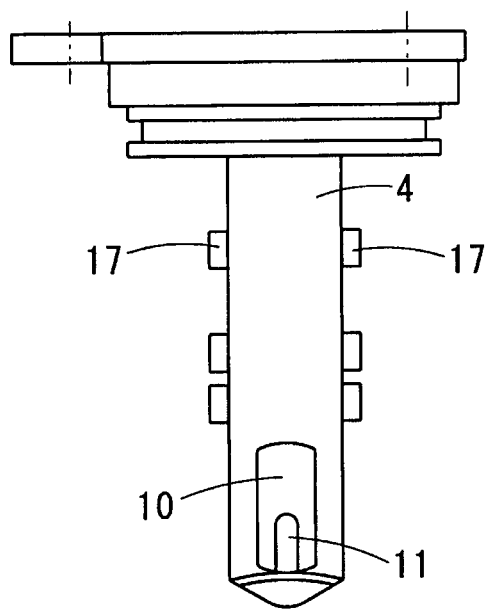
FIG. 23 is a front view illustrating the air flow rate measurement device according to the sixth embodiment.
Figure 24:
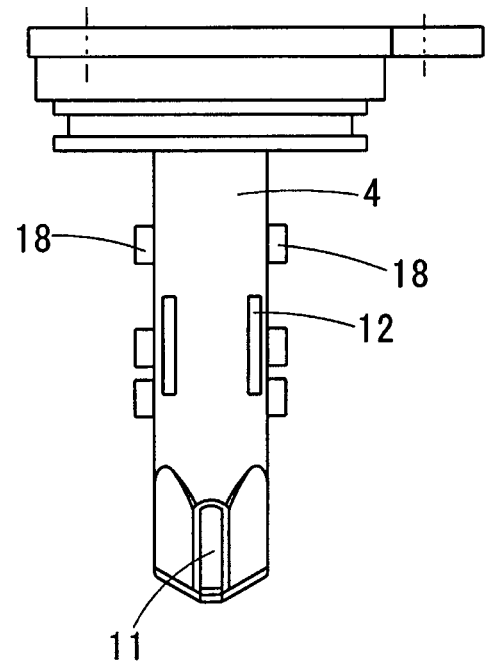
FIG. 24 is a back view illustrating the air flow rate measurement device according to the sixth embodiment.
Figure 25:
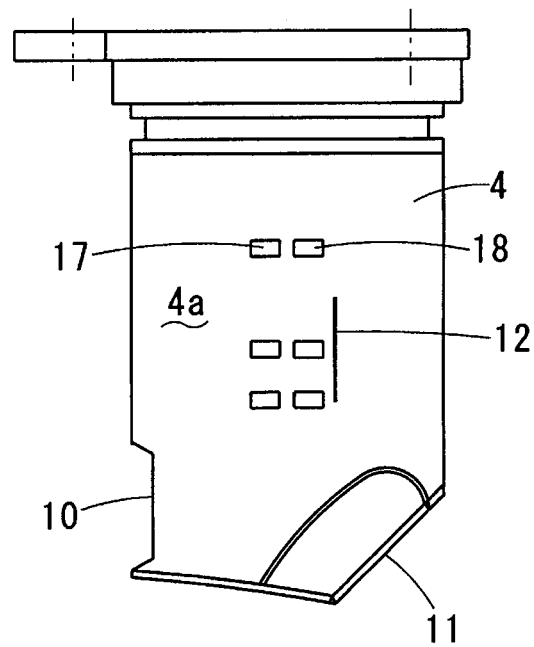
FIG. 25 is a side view illustrating the air flow rate measurement device according to the sixth embodiment.
Figure 26:
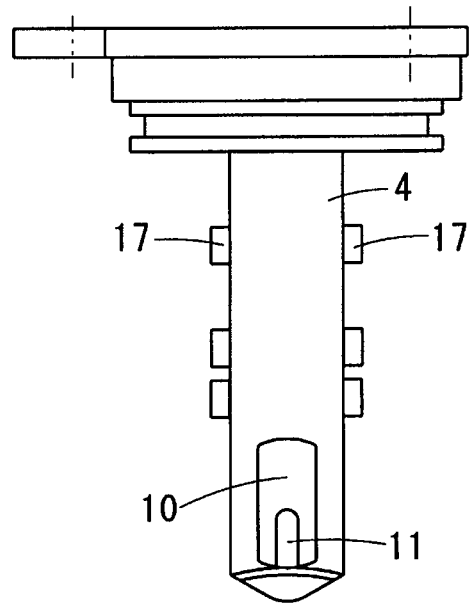
FIG. 26 is a front view illustrating the air flow rate measurement device according to the sixth embodiment.
Figure 27:
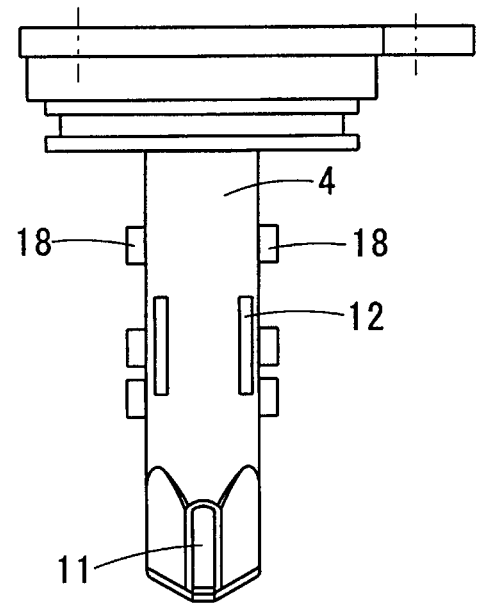
FIG. 27 is a back view illustrating the air flow rate measurement device according to the sixth embodiment.
Figure 28:
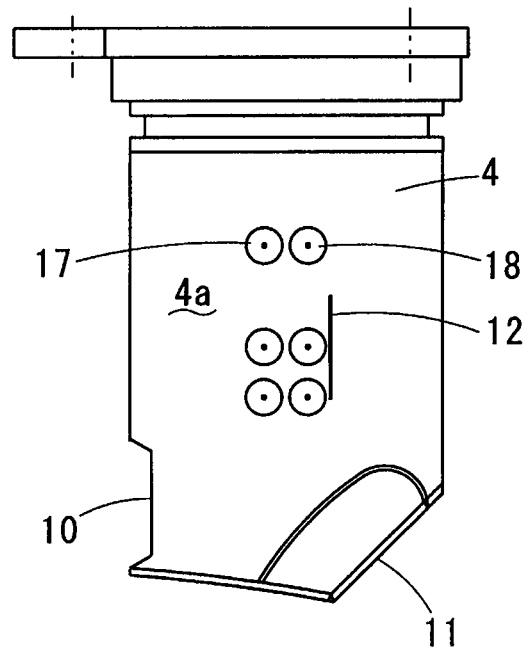
FIG. 28 is a side view illustrating the air flow rate measurement device according to the sixth embodiment.
Figure 29:
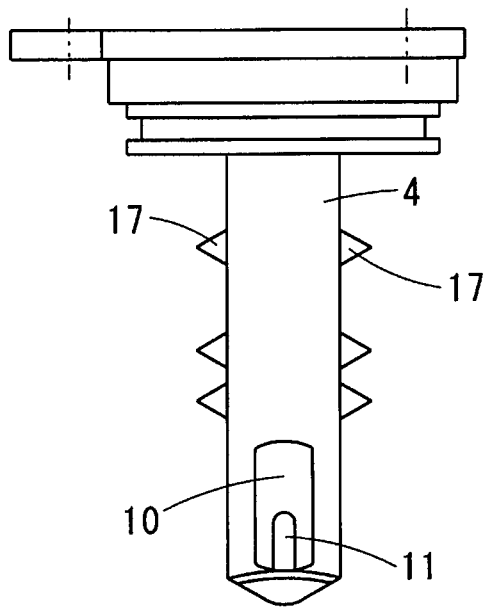
FIG. 29 is a front view illustrating the air flow rate measurement device according to the sixth embodiment.
Figure 30:
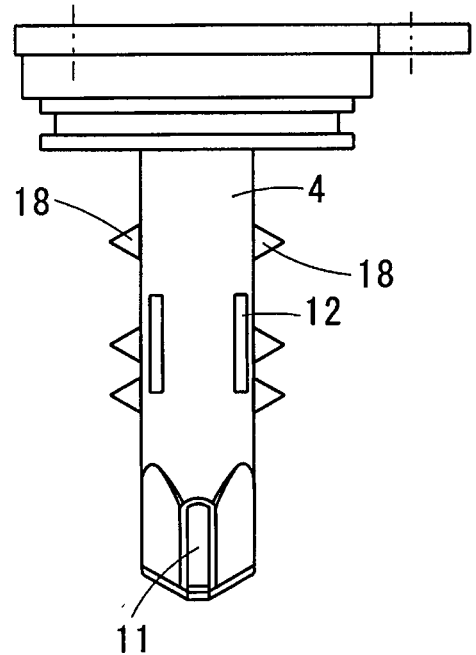
FIG. 30 is a back view illustrating the air flow rate measurement device according to the sixth embodiment.

The shape of the first and second protrusions 17, 18 when viewed in the direction perpendicular to the side surface 4a of the casing 4 may be an oval shape, as shown in FIGS. 22 to 24. The shape of the first and second protrusions 17, 18 may be a rectangular shape as shown in FIGS. 25 to 27, or a circular cone shape as shown in FIGS. 28 to 30. As described above, variable shapes are acceptable as the shape of the first and second protrusions 17, 18. Effects obtained in the first to fifth embodiment may be obtained regardless of the shape of the first and second protrusions 17, 18.

The cross-sectional shape of the casing 4 described in the first embodiment has the widest portion Wmax between the one end portion and the other end portion as shown in FIG. 5. However, the cross-sectional shape is not limited to this, and for example, one side surface 4a may be parallel to the other side surface 4a in the cross-section. The width of the cross-section may gradually increase from the one side toward the other side in the flow direction of the air. Whichever the casing 4 has the cross sectional shape, the first protrusion 17 is located upstream of the second protrusion 18 in the forward flow direction. In other words, the second protrusion 18 is located upstream of the first protrusion 17 in the backward flow direction.

Additional advantages and modifications will readily occur to those skilled in the art. The disclosure in its broader terms is therefore not limited to the specific details, representative apparatus, and illustrative examples shown and described.

What is claimed is:

1. An air flow rate measurement device comprising:
a casing disposed in a main flow passage in which an air flows, the casing defining a bypass passage therein to take in a part of the air flowing in the main flow passage;
a flow rate measurement portion being housed in the casing and measuring a flow rate of the air flowing in the bypass passage;
a first protrusion protruding from a side surface of the casing in the main flow passage; and
a second protrusion protruding from the side surface of the casing in the main flow passage, the second protrusion being spaced from the first protrusion in a flow direction of the air in the main flow passage, wherein
an imaginary plane perpendicular to the flow direction is defined, the imaginary plane dividing a length of the casing in the flow direction into two equal lengths,
a direction in which the air flows in the main flow passage from one side toward another side is defined as a forward flow direction,
a direction in which the air flows in the main flow passage from the another side toward the one side is defined as a backward flow direction,
the flow rate measurement portion is provided in the bypass passage,
the casing includes
an inlet opening of the bypass passage at an upstream end of the casing in the forward flow direction, and
an outlet opening of the bypass passage at a downstream end of the casing in the forward flow direction,
the bypass passage extends through the casing from the inlet opening to the outlet opening in the forward flow direction,
the second protrusion is located downstream of the imaginary plane in the forward flow direction and configured to generate vortices of air when air flows in the backward flow direction;
the bypass passage includes a first bypass passage extending from the inlet opening to the outlet opening, and a second bypass passage branched from the first bypass passage,
the second bypass passage has a bypass outlet from which the air passing through the flow rate measurement portion is discharged only in the forward flow direction, and
the second bypass passage extends from the bypass outlet along a direction in which the first bypass passage extends.

2. The air flow rate measurement device according to claim 1, wherein
a plurality of the first protrusions and a plurality of the second protrusions are provided on the side surface of the casing,
the plurality of first protrusions are spaced from each other in a direction perpendicular to the flow direction, and
the plurality of second protrusions are spaced from each other in the direction perpendicular to the flow direction.

3. The air flow rate measurement device according to claim 2, wherein the first protrusions and the second protrusions are arranged alternately in the direction perpendicular to the flow direction.

4. The air flow rate measurement device according to claim 2, wherein
the first protrusions are located upstream of the second protrusions in the forward flow direction, and
a number of the first protrusions is larger than a number of the second protrusions.

5. The air flow rate measurement device according to claim 4, wherein
a surface of the first protrusions opposed to the air flowing in the forward flow direction is oblique to the forward flow direction, and
a surface of the second protrusions opposed to the air flowing in the backward flow direction is angled with respect to the backward flow direction.

6. The air flow rate measurement device according to claim 1, wherein
the first protrusion is located upstream of the second protrusion in the forward flow direction,
a surface of the first protrusion opposed to an air flow in the forward flow direction is angled with respect to the forward flow direction, and
a surface of the second protrusion opposed to an air flow in the backward flow direction is oblique to the backward flow direction.

7. The air flow rate measurement device according to claim 1, wherein the first protrusion, the second protrusion and the bypass outlet are aligned in the flow direction.

8. The air flow rate measurement device according to claim 1, wherein
at least one of the first protrusion or the second protrusion has an ellipse shape.

9. The air flow rate measurement device according to claim 1, wherein
at least one of the first protrusion or the second protrusion has a circular cone shape.

10. The air flow rate measurement device according to claim 1, wherein
the first bypass passage extends through the casing in the forward flow direction and the second bypass passage has the bypass outlet on the side surface of the casing, and
the bypass outlet is located downstream of the imaginary plane in the forward flow direction.

11. The air flow rate measurement device according to claim 1, wherein
the first protrusion is located upstream of the imaginary plane in the forward flow direction.

12. The air flow rate measurement device according to claim 1, wherein
the first protrusion is located upstream of the second protrusion in the forward flow direction,
the side surface of the casing faces a width direction perpendicular to the forward flow direction,
a length of the casing in the width direction is a width of the casing,
a height direction is a direction perpendicular to both the width direction and the flow direction, and
a surface of the second protrusion opposed to an air flow in the backward flow direction is oblique to both the backward flow direction and the height direction.

13. The air flow rate measurement device according to claim 1, wherein
the first bypass passage extends straight in the flow direction,
the flow rate measurement portion is provided in the second bypass passage, and
the bypass outlet is located downstream of the first protrusion and the second protrusion in the forward flow direction.

14. The air flow rate measurement device according to claim 1, wherein
the flow rate measurement portion is located in the second bypass passage.

15. The air flow rate measurement device according to claim 1, wherein
the second bypass passage extends from the bypass outlet in parallel with the direction in which the first bypass passage extends.

16. An air flow rate measurement device comprising:
a casing disposed in a main flow passage in which an air flows, the casing defining a bypass passage therein to take in a part of the air flowing in the main flow passage;
a flow rate measurement portion being housed in the casing and measuring a flow rate of the air flowing in the bypass passage;
a first protrusion protruding from a side surface of the casing in the main flow passage; and
a second protrusion protruding from the side surface of the casing in the main flow passage, the second protrusion being spaced from the first protrusion in a flow direction of the air in the main flow passage, wherein
the side surface of the casing faces a width direction perpendicular to the flow direction,
a length of the casing in the width direction is a width of the casing,
the casing includes a widest portion between one end and another end in the flow direction, the widest portion having a maximum width in the casing,
the width of the casing continuously decreases from the widest portion toward the one end and the another end,
the flow rate measurement portion is provided in the bypass passage,
the casing includes
an inlet opening of the bypass passage at an upstream end of the casing in a forward flow direction, and
an outlet opening of the bypass passage at a downstream end of the casing in the forward flow direction,
the bypass passage extends through the casing from the inlet opening to the outlet opening in the flow direction,
the second protrusion is located downstream of the widest portion in the forward flow direction;
the bypass passage includes a first bypass passage extending from the inlet opening to the outlet opening, and a second bypass passage branched from the first bypass passage,
the second bypass passage has a bypass outlet from which the air passing through the flow rate measurement portion is discharged only in the forward flow direction, and
the second bypass passage extends from the bypass outlet along a direction in which the first bypass passage extends.

17. The air flow rate measurement device according to claim 16, wherein
the first protrusion is located upstream of the widest portion in the forward flow direction.

18. The air flow rate measurement device according to claim 16, wherein
the first bypass passage extends through the casing in the forward flow direction and the second bypass passage has the bypass outlet on the side surface of the casing, and
the bypass outlet is located downstream of the widest portion in the forward flow direction.

19. The air flow rate measurement device according to claim 16, wherein
the second bypass passage extends from the bypass outlet in parallel with the direction in which the first bypass passage extends.

* * * * *